（12）United States Patent
Hassan

(10) Patent No.: US 10,387,127 B2
(45) Date of Patent: Aug. 20, 2019

(54) DETECTING SEQUENTIAL ACCESS DATA AND RANDOM ACCESS DATA FOR PLACEMENT ON HYBRID MAIN MEMORY FOR IN-MEMORY DATABASES

(71) Applicant: SAP SE, Walldorf (DE)

(72) Inventor: Ahmad Hassan, Belfast (IE)

(73) Assignee: SAP SE, Walldorf (DE)

( * ) Notice: Subject to any disclaimer, the term of this patent is extended or adjusted under 35 U.S.C. 154(b) by 4 days.

(21) Appl. No.: 15/213,960

(22) Filed: Jul. 19, 2016

(65) Prior Publication Data

US 2018/0024821 A1 Jan. 25, 2018

(51) Int. Cl.
*G06F 8/41* (2018.01)

(52) U.S. Cl.
CPC .................. *G06F 8/441* (2013.01)

(58) Field of Classification Search
CPC ...... G06F 8/41; G06F 8/42; G06F 8/44; G06F 8/441; G06F 8/443; G06F 8/4432; G06F 8/4434
USPC ............... 717/151, 152, 153, 154, 158
See application file for complete search history.

(56) References Cited

U.S. PATENT DOCUMENTS

| | | | |
|---|---|---|---|
| 5,845,325 A | 12/1998 | Loo | |
| 6,157,955 A | 12/2000 | Narad et al. | |
| 6,195,731 B1 | 2/2001 | Bordaz et al. | |
| 6,760,721 B1 | 7/2004 | Chasen | |
| 6,952,664 B1 | 10/2005 | Lahiri et al. | |
| 7,181,578 B1 | 2/2007 | Guha | |
| 7,360,073 B1 | 4/2008 | Billstrom et al. | |
| 7,434,002 B1 | 10/2008 | Zedlewski et al. | |
| 7,624,381 B1 * | 11/2009 | Czajkowski | G06F 8/24 717/108 |
| 7,774,556 B2 * | 8/2010 | Karamcheti | G06F 9/5016 711/146 |
| 7,840,397 B2 | 11/2010 | Chiou | |
| 7,958,329 B2 * | 6/2011 | Holt | H04L 67/1097 711/100 |

(Continued)

OTHER PUBLICATIONS

Dhiman et al., "PDRAM: A hybrid PRAM and DRAM main memory system," Proceedings of the 46th Annual Design Automation Conference, Jul. 26-31, 2009, pp. 664-669.*

(Continued)

*Primary Examiner* — Andrew M. Lyons
(74) *Attorney, Agent, or Firm* — Fish & Richardson P.C.

(57) ABSTRACT

Implementations of the present disclosure include methods, systems, and computer-readable storage mediums for providing intermediate code based on source code, the intermediate code including at least one instruction for profiling at least one object of the application, providing a statistics file by processing the intermediate code, the statistics file including data indicating, for each object of a plurality of objects, a SAC and a RAC, the SAC indicating a number of times a respective object was sequentially accessed and the RAC indicating a number of times a respective object was sequentially accessed during execution of the workload, providing a list of objects, the list of objects identifying, for each object, a memory type for placement of the object in a hybrid memory system based on the RAC of the respective object, and placing objects in a hybrid memory system during execution of the application based on the list of objects.

20 Claims, 4 Drawing Sheets

(56) References Cited

U.S. PATENT DOCUMENTS

| | | |
|---|---|---|
| 8,170,859 B1 | 5/2012 | Christensson et al. |
| 8,185,471 B1 | 5/2012 | Walker et al. |
| 8,214,191 B2 | 7/2012 | Ferren et al. |
| 8,230,395 B1* | 7/2012 | Koh ................. G06F 9/44557 717/121 |
| 8,456,905 B2 | 6/2013 | Kasorla |
| 8,572,051 B1 | 10/2013 | Chen et al. |
| 8,862,588 B1 | 10/2014 | Gay |
| 8,868,537 B1 | 10/2014 | Colgrove et al. |
| 8,874,846 B2 | 10/2014 | Franceschini |
| 8,880,687 B1 | 11/2014 | Chandrachari et al. |
| 8,959,611 B1 | 2/2015 | Vincent |
| 8,966,462 B2* | 2/2015 | Gounares ............. G06F 9/5016 707/813 |
| 9,043,530 B1 | 5/2015 | Sundaram et al. |
| 9,304,913 B2* | 4/2016 | Dong ................... G11C 11/005 |
| 9,348,539 B1 | 5/2016 | Saxena |
| 9,626,327 B2 | 4/2017 | Eilert et al. |
| 9,652,380 B2 | 5/2017 | Byun et al. |
| 9,672,158 B2 | 6/2017 | Karamcheti et al. |
| 9,712,538 B1 | 7/2017 | Vincent et al. |
| 9,720,925 B1 | 8/2017 | Lawson |
| 9,720,967 B2 | 8/2017 | Lee et al. |
| 9,740,438 B2 | 8/2017 | Hassan |
| 9,841,914 B2 | 12/2017 | Hassan |
| 9,846,550 B2 | 12/2017 | Muralimanohar |
| 1,008,318 A1 | 9/2018 | Hassan |
| 2001/0027387 A1 | 10/2001 | Miyake et al. |
| 2003/0033431 A1 | 2/2003 | Shinomiya |
| 2004/0184340 A1 | 9/2004 | Dwarkasdas |
| 2005/0097078 A1 | 5/2005 | Lohman et al. |
| 2005/0108447 A1 | 5/2005 | Thadani |
| 2006/0059474 A1 | 3/2006 | Bhansali et al. |
| 2006/0117299 A1 | 6/2006 | Goldsmith et al. |
| 2007/0050328 A1 | 3/2007 | Li |
| 2007/0050609 A1 | 3/2007 | Ferren et al. |
| 2007/0202473 A1 | 8/2007 | Koda |
| 2007/0226186 A1 | 9/2007 | Ewen et al. |
| 2008/0005476 A1 | 1/2008 | Venkatesan |
| 2008/0034179 A1 | 2/2008 | Mewhinney et al. |
| 2008/0109592 A1 | 5/2008 | Karamcheti et al. |
| 2008/0140682 A1 | 6/2008 | Grosset et al. |
| 2008/0288718 A1 | 11/2008 | Hepkin et al. |
| 2008/0288742 A1 | 11/2008 | Hepkin et al. |
| 2009/0049234 A1 | 2/2009 | Oh et al. |
| 2009/0157952 A1 | 6/2009 | Kim et al. |
| 2009/0157964 A1 | 6/2009 | Kasorla |
| 2009/0182976 A1 | 7/2009 | Agesen et al. |
| 2009/0307462 A1 | 12/2009 | Fleming et al. |
| 2010/0010799 A1 | 1/2010 | Altrichter |
| 2010/0042999 A1 | 2/2010 | Dorai et al. |
| 2010/0153631 A1 | 6/2010 | Moon et al. |
| 2010/0169602 A1 | 7/2010 | Hulbert et al. |
| 2010/0262633 A1* | 10/2010 | Bhattacharjee ... G06F 17/30312 707/812 |
| 2010/0287356 A1 | 11/2010 | Cameron et al. |
| 2010/0306591 A1 | 12/2010 | Krishna |
| 2010/0318718 A1 | 12/2010 | Eilert et al. |
| 2011/0066808 A1 | 3/2011 | Flynn et al. |
| 2011/0072006 A1 | 3/2011 | Yu et al. |
| 2011/0078340 A1 | 3/2011 | Kim et al. |
| 2011/0093654 A1* | 4/2011 | Roberts ................. G06F 1/3203 711/105 |
| 2011/0131199 A1 | 6/2011 | Simon et al. |
| 2011/0271264 A1 | 11/2011 | Vorbach et al. |
| 2011/0313999 A1 | 12/2011 | Bruno et al. |
| 2012/0072744 A1* | 3/2012 | Jain ....................... G06F 1/3268 713/320 |
| 2012/0089595 A1 | 4/2012 | Jaecksch |
| 2012/0124318 A1 | 5/2012 | Bivens |
| 2012/0144092 A1 | 6/2012 | Hsieh |
| 2012/0151127 A1 | 6/2012 | Lim |
| 2012/0151252 A1 | 6/2012 | Harris et al. |
| 2012/0158799 A1* | 6/2012 | Morsi ............... G06F 17/30289 707/812 |
| 2012/0246392 A1 | 9/2012 | Cheon |
| 2012/0290768 A1 | 11/2012 | Rubowitz et al. |
| 2013/0013860 A1 | 1/2013 | Franceschini |
| 2013/0074092 A1* | 3/2013 | Gounares ............. G06F 9/44557 718/104 |
| 2013/0080621 A1 | 3/2013 | Jain et al. |
| 2013/0081005 A1* | 3/2013 | Gounares ............. G06F 9/5016 717/148 |
| 2013/0086309 A1 | 4/2013 | Lee |
| 2013/0103380 A1 | 4/2013 | Brandstatter et al. |
| 2013/0226903 A1 | 8/2013 | Wu et al. |
| 2013/0246698 A1 | 9/2013 | Estan |
| 2013/0275716 A1 | 10/2013 | Nishida |
| 2013/0283250 A1 | 10/2013 | Eichenberger |
| 2013/0326109 A1 | 12/2013 | Kivity |
| 2014/0007043 A1 | 1/2014 | Aliseychik et al. |
| 2014/0089564 A1 | 3/2014 | Liu et al. |
| 2014/0108723 A1 | 4/2014 | Nowoczynski |
| 2014/0188870 A1 | 7/2014 | Borthakur |
| 2014/0280685 A1 | 9/2014 | Magenheimer |
| 2014/0281212 A1 | 9/2014 | Schreter et al. |
| 2014/0281249 A1 | 9/2014 | Waldsperger |
| 2014/0282455 A1 | 9/2014 | Felch |
| 2014/0293801 A1 | 10/2014 | Dimou |
| 2015/0012465 A1 | 1/2015 | Pingenot |
| 2015/0062736 A1* | 3/2015 | Kim ..................... G11B 20/1252 360/48 |
| 2015/0077426 A1 | 3/2015 | Kweon et al. |
| 2015/0081300 A1 | 3/2015 | Kim |
| 2015/0089604 A1 | 3/2015 | Mathew |
| 2015/0106582 A1 | 4/2015 | Mai et al. |
| 2015/0169226 A1* | 6/2015 | Shen ................... G06F 12/0238 711/103 |
| 2015/0199126 A1 | 7/2015 | Jayasena |
| 2015/0206574 A1 | 7/2015 | Greathouse |
| 2015/0309789 A1 | 10/2015 | Thorat |
| 2015/0363319 A1 | 12/2015 | Qi |
| 2015/0370560 A1 | 12/2015 | Tan |
| 2015/0378169 A1 | 12/2015 | Naeimi |
| 2016/0005423 A1* | 1/2016 | Neppalli, Sr. ............. G11B 5/09 360/25 |
| 2016/0019132 A1 | 1/2016 | Vilakkunnadathil |
| 2016/0117258 A1* | 4/2016 | Karamcheti .......... G06F 9/5016 711/168 |
| 2016/0125927 A1 | 5/2016 | Wei |
| 2016/0150003 A1* | 5/2016 | Magdon-Ismail ....... G06F 12/00 709/223 |
| 2016/0179685 A1 | 6/2016 | Byun et al. |
| 2016/0188217 A1* | 6/2016 | Golander ................ G06F 3/065 711/162 |
| 2016/0196112 A1 | 7/2016 | Edwards et al. |
| 2016/0196324 A1* | 7/2016 | Haviv ............... G06F 17/30598 707/626 |
| 2016/0253093 A1 | 9/2016 | Zhang |
| 2016/0321048 A1 | 11/2016 | Matsuura |
| 2016/0328169 A1* | 11/2016 | Hassan ................. G06F 3/0625 |
| 2016/0336069 A1 | 11/2016 | Lin |
| 2016/0378169 A1 | 12/2016 | Naeimi |
| 2016/0378829 A1 | 12/2016 | Vengerov et al. |
| 2016/0378977 A1 | 12/2016 | Alme |
| 2017/0010817 A1 | 1/2017 | Lim |
| 2017/0052741 A1 | 2/2017 | Hassan |
| 2017/0052742 A1 | 2/2017 | Hassan |
| 2017/0060740 A1 | 3/2017 | Doerner |
| 2017/0090776 A1 | 3/2017 | Kowles |
| 2017/0091334 A1 | 3/2017 | Kabiljo et al. |
| 2017/0115892 A1 | 4/2017 | Gokita |
| 2017/0116210 A1 | 4/2017 | Park et al. |
| 2017/0147516 A1 | 5/2017 | De |
| 2017/0154136 A1 | 6/2017 | Eckmann et al. |
| 2017/0160955 A1 | 6/2017 | Jayasena |
| 2017/0161198 A1 | 6/2017 | Trika |
| 2017/0193136 A1 | 7/2017 | Prasad et al. |
| 2017/0206010 A1 | 7/2017 | Nachimuthu |
| 2017/0206172 A1 | 7/2017 | Ma |
| 2017/0212843 A1 | 7/2017 | Agesen et al. |

(56) References Cited

U.S. PATENT DOCUMENTS

| | | |
|---|---|---|
| 2017/0220256 A1 | 8/2017 | Balasubramonian |
| 2017/0220257 A1 | 8/2017 | Balasubramonian |
| 2017/0220488 A1 | 8/2017 | Balasubramonian |
| 2017/0220516 A1 | 8/2017 | Eilert et al. |
| 2017/0223046 A1 | 8/2017 | Singh |
| 2017/0242595 A1 | 8/2017 | Niu |
| 2017/0289000 A1 | 10/2017 | Park et al. |
| 2017/0301386 A1 | 10/2017 | Parks et al. |
| 2017/0352012 A1 | 12/2017 | Hearn et al. |
| 2018/0024750 A1 | 1/2018 | Hassan |
| 2018/0024754 A1 | 1/2018 | Hassan |
| 2018/0024755 A1 | 1/2018 | Hassan |
| 2018/0024821 A1 | 1/2018 | Hassan |
| 2018/0024913 A1 | 1/2018 | Hassan |
| 2018/0024922 A1 | 1/2018 | Hassan |
| 2018/0024923 A1 | 1/2018 | Hassan |
| 2018/0024928 A1 | 1/2018 | Hassan |
| 2018/0024997 A1 | 1/2018 | Hassan |
| 2018/0025016 A1 | 1/2018 | Hassan |
| 2018/0025055 A1 | 1/2018 | Hassan |
| 2018/0025904 A1 | 1/2018 | Hassan |
| 2019/0057131 A1 | 2/2019 | Hassan |

OTHER PUBLICATIONS

Hassan et al., "Energy-Efficient In-Memory Data Stores on Hybrid Memory Hierarchies," Eleventh International Workshop on Dada Management on New Hardware, Jun. 2015, last retrieved from https://event.cwi.nl/damon2015/slides/slides-hassan.pdf on Jan. 5, 2018.*

Hassan et al., "Analytical models and techniques for Software-Managed Energy-Efficient Hybrid DRAM/NVM Main Memory," AMC International Conference on Computing Frontiers 2015, May 18-21, 2015.*

Hu et al., "Data allocation optimization for hybrid scratch pad memory with sram and nonvolatile memory," IEEE Transactions on Very Large Scale Integration (VLSI) Systems, Jun. 2013, 21(6): 1094-1102.*

Li et al., "Assert(!Defined(Sequential I/O))," Proceedings of the 6th USENIX Conference on Hot Topics in Storage and File Systems, Jun. 17-18, 2014, 1-5.*

Mogul et al., "Operating system support for NVM+DRAM hybrid main memory," Proceedings of teh 12th Conference on Hot Topics in Operating Systems, May 18-20, 2009, 1-5.*

Ramos et al., "p. placement in hybrid memory systems," Proceedings of the International Conference on Supercomputing, May 31-Jun. 4, 2011.*

Wang et al., "Optimizated Allocation of Data Variables to PCM/DRAM-based Hybrid Main Memory for Real-Time Embedded Systems," Embedded Systems Letters, IEEE, Sep. 2014, 6(3):61-64.*

Chen, Y., Ranganathan, K., Puthenveetil, A.K., Bazargan, K., & Lilja, D.J. (2004). FSRAM: Flexible Sequential and Random Access Memory for Embedded Systems. (Year: 2004).*

S. R. Dulloor et al. 2016. Data tiering in heterogeneous memory systems. In Proceedings of the Eleventh European Conference on Computer Systems (EuroSys '16). ACM, New York, NY, USA, Article 15, 16 pages. (Year: 2016).*

X. Ouyang et al., "SSD-Assisted Hybrid Memory to Accelerate Memcached over High Performance Networks," 2012 41st International Conference on Parallel Processing, Pittsburgh, PA, 2012, pp. 470-479. (Year: 2012).*

C. Wang et al., "NVMalloc: Exposing an Aggregate SSD Store as a Memory Partition in Extreme-Scale Machines," 2012 IEEE 26th International Parallel and Distributed Processing Symposium, Shanghai, 2012, pp. 957-968. (Year: 2012).*

U.S. Appl. No. 14/704,461, filed May 5, 2015, Ahmad Hassan.
U.S. Appl. No. 14/831,567, filed Aug. 20, 2015, Ahmad Hassan.
U.S. Appl. No. 14/831,624, filed Aug. 20, 2015, Ahmad Hassan.
U.S. Appl. No. 15/677,700, filed Aug. 15, 2017, Hassan.

Luk et al., "Pin Building Customized Program Analysis Tools with Dynamic Instrumentation," ACM Sigplan Notices, Jun. 2005, 40(6) 190-200.

U.S. Office Action in related U.S. Appl. No. 15/213,621 dated Dec. 13, 2018, 12 pages.
U.S. Office Action in related U.S. Appl. No. 15/213,621 dated May 17, 2018, 11 pages.
U.S. Office Action in related U.S. Appl. No. 15/213,654 dated Dec. 1, 2017, 21 pages.
U.S. Office Action in related U.S. Appl. No. 15/213,654 dated Jul. 2, 2018, 41 pages.
U.S. Office Action in related U.S. Appl. No. 15/213,654 dated Mar. 16, 2018, 31 pages.
U.S. Office Action in related U.S. Appl. No. 15/213,654 dated Nov. 27, 2018, 7 pages.
U.S. Office Action in related U.S. Appl. No. 15/213,754 dated Feb. 27, 2018, 23 pages.
U.S. Office Action in related U.S. Appl. No. 15/213,754 dated Jun. 20, 2018, 22 pages.
U.S. Office Action in related U.S. Appl. No. 15/213,754 dated Sep. 11, 2018, 22 pages.
U.S. Office Action in related U.S. Appl. No. 15/213,816 dated Jul. 26, 2018, 27 pages.
U.S. Office Action in related U.S. Appl. No. 15/213,930 dated Jun. 19, 2018, 20 pages.
U.S. Office Action in related U.S. Appl. No. 15/213,930 dated Mar. 9, 2018, 20 pages.
U.S. Office Action in related U.S. Appl. No. 15/213,930 dated Oct. 20, 2018, 23 pages.
U.S. Office Action in related U.S. Appl. No. 15/214,019 dated Aug. 27, 2018, 8 pages.
U.S. Office Action in related U.S. Appl. No. 15/214,019 dated Dec. 22, 2017, 12 pages.
U.S. Office Action in related U.S. Appl. No. 15/214,019 dated Jun. 14, 2018, 10 pages.
U.S. Office Action in related U.S. Appl. No. 15/214,082 dated Aug. 27, 2018, 27 pages.
U.S. Office Action in related U.S. Appl. No. 15/214,102 dated Jul. 24, 2018, 33 pages.
U.S. Office Action in related U.S. Appl. No. 15/213,626 dated Apr. 12, 2019, 23 pages.
U.S. Office Action in related U.S. Appl. No. 15/213,674 dated Apr. 12, 2019, 27 pages.
Office Action in U.S. Appl. No. 15/213,930 dated Feb. 26, 2019, 35 pages.
Final Office Action issued in U.S. Appl. No. 15/214,082 dated Mar. 8, 2019, 41 pages.
U.S. Office Action in related U.S. Appl. No. 15/213,754 dated Jan. 29, 2019, 29 pages.
U.S. Office Action in related U.S. Appl. No. 15/213,816 dated Feb. 7, 2019, 27 pages.
U.S. Office Action in related U.S. Appl. No. 15/214,102 dated Feb. 6, 2019, 34 pages.
Zakai, "Emscripten: An LLVM-to-JavaScript Compiler," Proceedings of the ACM international conference companion on Object oriented programming systems languages and applications companion (OOPSLA), Portland, Oregon, Oct. 22-27, 2011, 12 pages.
U.S. Office Action in related U.S. Appl. No. 15/213,754 dated May 23, 2019, 32 pages.

* cited by examiner

DETECTING SEQUENTIAL ACCESS DATA AND RANDOM ACCESS DATA FOR PLACEMENT ON HYBRID MAIN MEMORY FOR IN-MEMORY DATABASES

BACKGROUND

A business or other type of enterprise may operate enterprise systems to provide software functionality to customers and employees. An enterprise system may include back-end enterprise servers that host enterprise applications such as enterprise resource planning (ERP) systems, client-relationship management (CRM) systems, product lifecycle management (PLM) systems, supply chain management (SCM) systems, supplier relationship management (SRM) systems, and so forth. During the execution of an enterprise application, application data may be placed in or accessed from the main memory of the enterprise server, such that the application data is immediately accessible by processors of the enterprise server.

Increasingly, large amounts of application data are stored in the main memory of enterprise servers. Main memory may include dynamic random access memory (DRAM), which consumes a relatively high amount of static energy both in active and idle states due to continuous leakage and refresh power. Various byte-addressable non-volatile memory (NVM) technologies promise near-zero static energy and persistence. However, NVM may exhibit high latency and high dynamic energy relative to DRAM.

SUMMARY

Implementations of the present disclosure include computer-implemented methods for detecting sequential access data, and random access data for selective placement on respective memory types in a hybrid memory system. In some implementations, methods include actions of providing intermediate code based on source code, the intermediate code including at least one instruction for profiling at least one object of the application, providing a statistics file by processing the intermediate code, the statistics file including data indicating, for each object of a plurality of objects, a sequential access count (SAC) and a random access count (RAC), the SAC indicating a number of times a respective object was sequentially accessed during execution of a workload, and the RAC indicating a number of times a respective object was sequentially accessed during execution of the workload, providing a list of objects, the list of objects identifying, for each object, a memory type for placement of the object in a hybrid memory system based on the RAC of the respective object, and placing objects in a hybrid memory system during execution of the application based on the list of objects.

These and other implementations may each optionally include one or more of the following features: during processing of the intermediate code, the SAC is incremented for a respective object, if memory locations of consecutive accesses are identical; during processing of the intermediate code, the SAC is incremented for a respective object, if memory locations of consecutive accesses are within a threshold distance of one another; during processing of the intermediate code, the RAC is incremented for a respective object, if memory locations of consecutive accesses are not identical, and if memory locations of consecutive accesses are not within a threshold distance of one another; the list of objects includes the plurality of objects, and, for each object, indicates whether the respective object is to be placed on one of a first memory type and a second memory type; the respective object is associated with a first memory type, if the RAC exceeds a threshold, and is associated with a second memory type if the RAC does not exceed the threshold; and the hybrid main memory system includes at least dynamic random access memory (DRAM) and non-volatile memory (NVM).

The present disclosure also provides one or more non-transitory computer-readable storage media coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure may include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
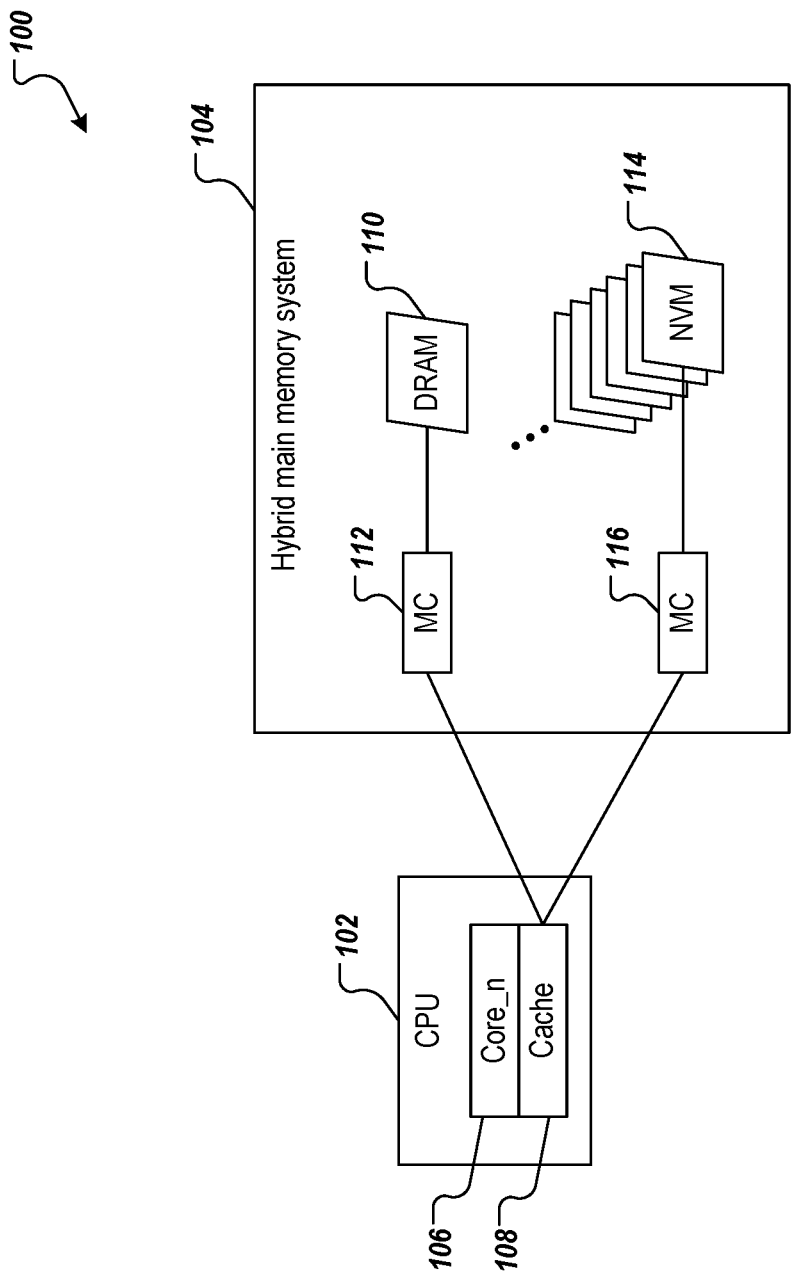
FIG. 1 depicts an example memory architecture in accordance with implementations such as those of the present disclosure.

Implementations of the present disclosure are generally directed to detecting sequential access data, and random access data for selective placement on respective memory types in a hybrid memory system. In some implementations, actions can include providing intermediate code based on source code, the intermediate code including at least one instruction for profiling at least one object of the application, providing a statistics file by processing the intermediate code, the statistics file including data indicating, for each object of a plurality of objects, a sequential access count (SAC) and a random access count (RAC), the SAC indicating a number of times a respective object was sequentially accessed during execution of a workload, and the RAC indicating a number of times a respective object was sequentially accessed during execution of the workload, providing a list of objects, the list of objects identifying, for each object, a memory type for placement of the object in a hybrid memory system based on the RAC of the respective object, and placing objects in a hybrid memory system during execution of the application based on the list of objects.

To provide context for implementations of the present disclosure, real-time data analytics aim at making knowledge available with sub-second and often sub-millisecond response time. For example, real-time enterprise resource planning (ERP) systems enable enterprises to view every change in the enterprise as soon as it happens, and can be a driver in the success of the enterprise. In some examples, real-time access to information helps in gaining competitive advantage through efficient and improved (e.g., more informed) decision making, product pricing, risk management, product life-cycle, customer feedback, customer engagement, brand development, product pricing, and reduced total cost of ownership (TCO). The growing volumes of enterprise data makes it challenging to achieve the target response times in real-time data analytics.

The advances in multi-core processing, caching and less expensive main memory has brought a major breakthrough in designing real-time enterprise systems. In-memory databases open doors for real-time analytics as it uses faster main-memory as a primary storage and bypass I/O disk delays in analytical data processing. Improvements in both hardware and in-memory databases have triggered the unification of both operational and analytical storage models together in a unified in-memory data store. For example, slower, disk-based memory is only required for persistent storage. This has a negligible impact on the throughput of in-memory databases, because persistence is moved from the critical path. Accordingly, in-memory databases enable real-time data analytics on unified data with minimal response times, because the data resides in main memory, which is an order of magnitude faster for accessing than traditional, disk-based memory.

With regard to types of memory used for in-memory systems, non-volatile memory (NVM) that provides persistence (like a traditional hard disk), and byte-addressability (like conventional DRAM) is termed as storage class memory (SCM). Examples SCMs include phase change memory (PCM), spin transfer torque memory (STT-RAM), and memristors. DRAM uses capacitance to store electric charge, which requires continuous power due to leakage. NVM uses resistance, rather than capacitance, for bit representation. Both DRAM and NVM consume static energy and dynamic energy. Static energy is consumed at all times when the memory system is switched on, and is independent of any memory accesses. Dynamic energy is an energy that is consumed by an actual read or a write operation (memory accesses). Static energy is further divided into cell leakage energy, and refresh energy. NVM is superior to DRAM with respect to static energy consumption, because NVM has low leakage energy, and does not require refresh energy. With non-negligible leakage power and relatively high refresh power, DRAM can consume 30-40% of the total server power. The DRAM size directly influences the power consumption of the servers.

NVM is more scalable than DRAM. For example, it has been shown that PCM can scale down to 10 nm, while the ability of DRAM to scale below 22 nm feature sizes is yet to be confirmed. Through NVM, such highly scalable and denser main memory storage enables building of enterprise systems with larger main memory storage capacity. However, the read or write access latency and dynamic energy of NVM are higher than DRAM. For example, the read latency and the write latency of PCM is approximately 4.4× and 12× times that of DRAM, respectively. As another example, the read dynamic energy and the write dynamic energy of PCM is approximately 2× and 43× times that of DRAM, respectively. Further, the storage cells of NVM wear with the usage.

Accordingly, the discrepancies in access latency and dynamic energy, as well as wear of NVM, pose challenges in using NVM as an alternative to DRAM. However, the scaling properties and low static energy of NVM are motivating factors in the design of energy efficient hybrid main memory systems that include both NVM and DRAM. In general, designing an energy efficient hybrid memory system typically focuses on designing a hybrid memory system that is more energy efficient than a DRAM-only memory system. Here, energy efficiency is achieved through the low static energy of NVM in comparison to DRAM. One strategy is to replace as much DRAM as possible with NVM for reducing the energy consumption of the system, with a constraint of keeping the performance degradation (which results from NVM) to a defined minimum.

Implementations are applicable to hybrid main memory systems, including DRAM and NVM, to support the operations of one or more applications executing in an enterprise environments, or any other appropriate computing environment. For example, application(s) may employ an in-memory database to enable access to the database with lower latency than may be exhibited when accessing a database stored in a disk storage device.

In view of the above context, and as described in further detail herein, implementations of the present disclosure are generally directed to distinguishing between randomly accessed, and sequentially accessed data objects, and selectively placing data objects on DRAM or NVM. For example, NVM performs faster for random access in comparison to sequential accesses. However, random access on NVM is still slower than on DRAM. In order to reduce performance degradation due to slower NVM, and in accordance with implementations of the present disclosure, randomly accessed data should be placed on NVM, and sequentially accessed data on DRAM. In some implementations, and as described in further detail herein, an analysis is conducted on each object allocated by an in-memory database running a benchmark workload (e.g., benchmark queries) on a hybrid memory system. In this analysis, implementations of the present disclosure detect randomly accessed objects within the in-memory database, hash objects (hash heaps) that are always randomly accessed by nature. In some examples, a hash heap (hash object) is an array of indices that is used for fast hash lookups. Rather than searching the columns values on the basis of actual data, the accelerated search is performed using hash indices. In accordance with implementations, randomly accessed objects are stored on NVM, and all other objects (e.g., sequentially accessed objects) are stored on DRAM.

FIG. 1 depicts an example memory architecture 100 that may be implemented within an enterprise server or other type of computing device(s). In the example of FIG. 1, the example memory architecture 100 includes a central processing unit (CPU) 102 and a hybrid main memory system 104. The CPU 102 includes a core 106 having a respective cache 108. Although a single core 106 and respective cache 108 is depicted, it is appreciated that the CPU 102 may include multiple cores 106, each with a respective cache 108. Further, although a single CPU 102 is depicted, it is appreciated that computing device(s) may include multiple CPUs 102. The main memory system 104 includes DRAM 110 with a respective memory controller (MC) 112, and NVM 114 with a respective MC 116. In some cases, a cache 108 accesses (e.g., reads, writes, deletes, etc.) data in the DRAM 110 through the MC 112, and accesses data in the NVM 114 through the MC 116. The hybrid main memory system 104 may include any number of instances, or cells, of DRAM and NVM, to provide any amount of memory for use by the CPU(s) 102.

In some examples, the example memory architecture 100 may support an in-memory database that uses main memory for data storage. Main memory may include one or more types of memory (e.g., DRAM, NVM) that communicates with one or more processors, e.g., CPU(s), over a memory bus. An in-memory database system may be contrasted with database management systems that employ a disk storage mechanism. In some examples, in-memory database systems may be faster than disk storage databases, because internal optimization algorithms may be simpler and execute fewer CPU instructions. In some examples, accessing data in an in-memory database system may reduce or eliminate seek time when querying the data, providing faster and more predictable performance than disk-storage databases. An in-memory database may include a row-oriented database, in which data is stored in any number of rows or records. An in-memory database may also include a column-oriented in-memory database, in which data tables are stored as sections of columns of data (rather than as rows of data). An example in-memory database system is HANA™, provided by SAP™ SE of Walldorf, Germany.

In accordance with implementations of the present disclosure, sequential accesses (also referred to as DRAM-friendly accesses) can include a plurality of types of sequential accesses. Example types of sequential accesses include: sequential access with maximum stride $S_i$ (where $i \in 1, 2, 3, \ldots$); sequential access to same cache line (e.g., of cache level $L_1$, $L_2$, $L_3$) of size N (e.g., N=64); and sequential access to same memory location. In some examples, random accesses include consecutive memory accesses that falls into different cache lines. In accordance with implementations of the present disclosure, random memory accesses are referred to as NVM-friendly memory accesses, and sequential memory accesses are referred to as DRAM-friendly memory access. Further, implementations of the present disclosure detect hash objects that are allocated within the database code. In some examples, because accesses to hash objects are inherently random in nature, hash objects are placed on NVM.

In accordance with implementations of the present disclosure, an object profiler is used to record all the memory allocations (e.g., stack, globals, heap) made during execution of an application of an in-memory database system. In some examples, a runtime library is embedded into the application to provide an instrumented application (e.g., an instrumented application executable), which includes a cache simulator.

In some implementations, a set of benchmark queries are executed to provide the statistics file. Example benchmark queries can include queries provided in the TPC Benchmark H (TPC-H) provided by the Transaction Processing Performance Council of San Francisco, Calif. The TPC-H is a decision support benchmark that includes a set of business oriented ad-hoc queries (e.g., a set of benchmark queries), and concurrent data modifications. The TPC-H is described as being representative of decision support systems that examine large volumes of data, execute queries with a high degree of complexity, and provide answers to critical business questions. In some implementations, during execution of each query, all loads and/or stores (accesses) of each object are passed through the cache simulator. In some examples, the cache simulator determines whether an access to an object is a sequential access (DRAM-friendly), or a random access (NVM-friendly).

Implementations of the present disclosure provide for object placement on hybrid memory systems. In accordance with implementations of the present disclosure, a threshold is provided, which defines a threshold as to whether an object is to be placed on DRAM or NVM. In some example, the threshold indicates a percentage of total access that are random access. An example threshold can be provided as 30%. In some examples, if the number of random accesses recorded for an object (e.g., as determined form the statistics file) exceeds the threshold, the object is to be placed on NVM, otherwise the object is placed on DRAM. For example, if more than 30% of a particular object's accesses are random access, the object is stored on NVM, otherwise, the object is stored on DRAM.

Algorithm 1, below, provides an example algorithm in accordance with implementations of the present disclosure:

---

Algorithm 1: Identifying Sequential vs. Random Access Objects

Profile Memory allocations
    If database allocates HASH heap then
        Mark object as random access object (NVM-friendly)
For two consecutive accesses 'X' and 'Y' to an object 'O'
If X == Y then
    Increment Sequential Access Count (SAC)
    Store line number in the profiler for this object
ELSE If (X−Y)/bytes_to_access ≤ 8 then
    Increment SAC
    Store line number in the profiler for this object
ELSE If (X−Y)/bytes_to_access ≤ 64 then
    Increment SAC
    Store line number in the profiler for this object
ELSE
    Find the line number of memory access 'Y'
    If line_number(Y) ≠ line_number(X)
        Increment Random Access Count (RAC)
        Store line number in the profiler for this object

---

Algorithm 2, below, provides an example algorithm for object placement in accordance with implementations of the present disclosure:

Set threshold of, for example, 30% which means that if percentage of random accesses of an object is greater than or equal to 30%, the object is determined to be a randomly accessed object. If the percentage of random accesses of the object is less than 30%, the object is determined to be a sequentially accessed object.

---

Algorithm 2: Object Placement

Let 'T' be the percentage Threshold:
if RAC < T:
    Place object on DRAM
else
    Place object on NVM
If database allocates HASH heap then
    Place HASH heap on NVM

---

Figure 2:
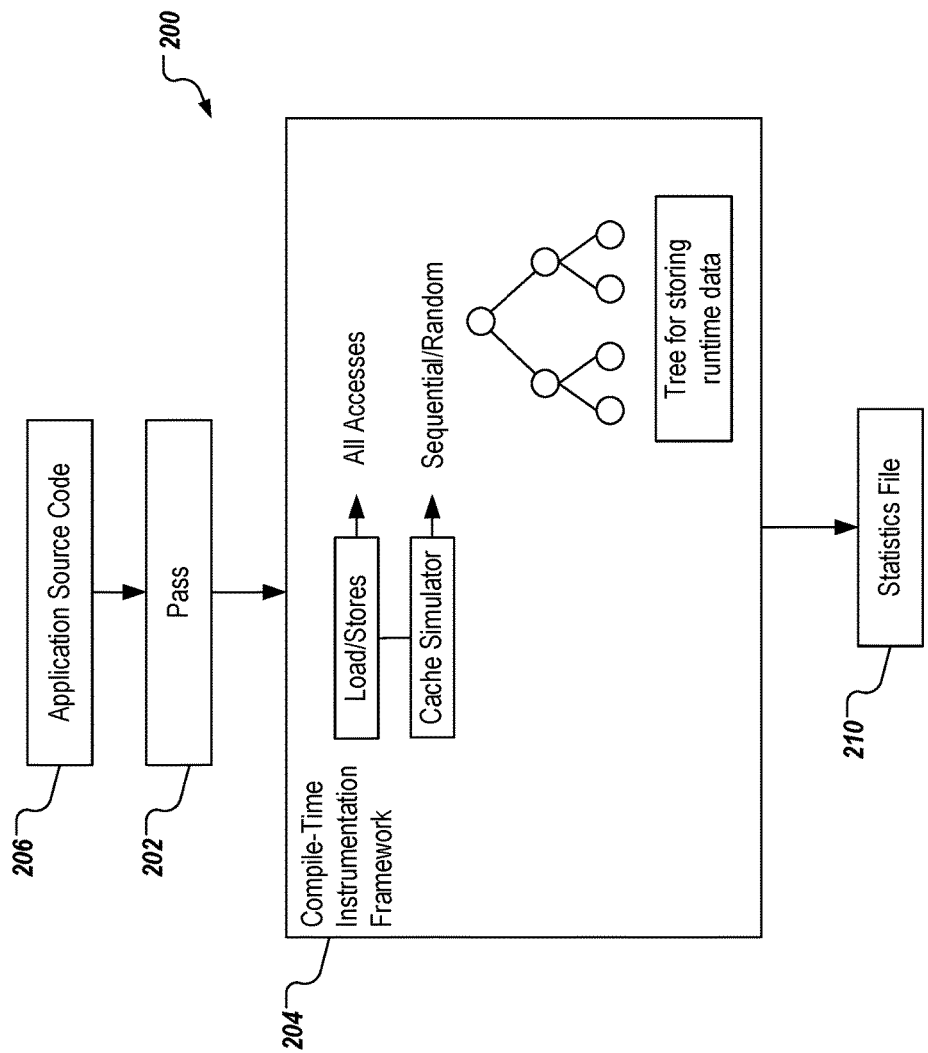
FIG. 2 depicts an example architecture to provide identify sequentially accessed objects and randomly accessed objects in accordance with implementations of the present disclosure.

FIG. 2 depicts an example architecture 200 to provide identify sequentially accessed objects and randomly accessed objects in accordance with implementations of the present disclosure. In the depicted example, the example architecture 200 includes a pass 202 (e.g., an LLVM pass), and a compile-time instrumentation framework 204. In some examples, the pass 202 receives application source code 206 (e.g., source code of the application, data objects of which are to be individually profiled), and provides executable code. In some examples, the pass 202 compiles the source code and adds instrumentation code to provide the executable code. In some examples, the instrumentation code includes instructions to profile one or more lines of the application during execution.

In some examples, the executable code is provided as bit-code (e.g., machine-readable code) and is executed by the compile-time instrumentation framework 204 to provide a statistics file 210, as described in further detail herein. In some examples, the statistics file 210 provides, for each object that is to be profiled, memory access data. In some examples, the statistics file 210 further provides, for each access associated with the object, whether the access is sequential or random (e.g., based on the cache simulator). In some example, data provided in the statistics file 210 is processed to determined, for each object, whether the object is a sequentially accessed object, or randomly accessed object, and designated memory type placement (e.g., NVM, DRAM), as described herein.

Figure 3:
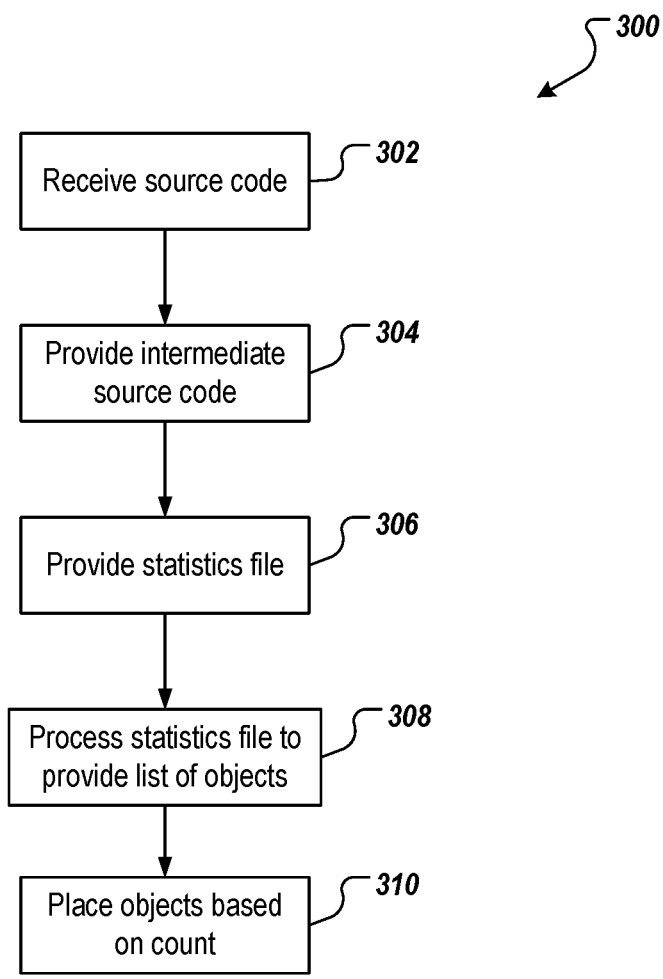
FIG. 3 depicts an example process that can be executed in accordance with implementations such as those of the present disclosure.

FIG. 3 depicts an example process 300 that can be executed in accordance with implementations of the present disclosure. In some implementations, the example process 300 may be performed using one or more computer-executable programs executed using one or more computing devices.

Source code of an application is received (302). For example, the profiling tool can receive the source code of the application. Intermediate code is provided based on the source code (304). For example, a pass (e.g., LLVM pass) of the profiling tool can provide the intermediate code based on the source code, as described herein. In some examples, the intermediate code includes at least one instruction for profiling at least one object of the application. A statistics file is provided (306). For example, the profiling tool processes the intermediate code based on a memory profiling library to provide the statistics file, as described herein. The statistics file is processed to provide a list of objects (308). For example, the statistics file includes data indicating, for each object of a plurality of objects, a SAC and a RAC, the SAC indicating a number of times a respective object was sequentially accessed during execution of a workload (e.g., benchmark workload), and the RAC indicating a number of times a respective object was sequentially accessed during execution of the workload. Objects are placed in a hybrid memory system during execution of the application based on the list of objects (310). For example, each object in the list of objects is associated with a first type of memory (e.g., DRAM), or a second type of memory (e.g., NVM) based on the RAC of the respective object. In some examples, if the object is to be stored in memory, the object is allocated to one of the first type of memory and the second type of memory based on the respective RAC, as described herein.

Implementations of the present disclosure are also directed to data placement decisions (e.g., NVM, DRAM) that are driven from the access properties of each object. In some examples, gathering detailed access patterns at the relatively fine granularity of application data objects can be challenging, because it slows down the execution of the application. However, understanding the access pattern can be a key factor for optimizing the locality of an application. In some examples, locality refers to spatial locality and temporal locality. In some examples, spatial locality is the distance between to two consecutive data accesses. In some examples, temporal locality refers to the reuse of the same memory location at relatively close points in time. Temporal locality represents that recently accessed memory locations are likely to be accessed again in near future. Both spatial and temporal represents the principle of locality, which means that an application tends to reuse data from nearby memory locations to the one they have accessed or re-access the same location.

Implementations of the present disclosure, as described in further detail herein, provide relatively simple and optimal means to identify both spatial and temporal locality of application objects. In some examples, objects with relatively good locality are ideal for allocation on NVM, because fewer read and write access will reach the NVM. In some examples, objects with relatively bad locality are candidates for placement on DRAM.

In further detail, implementations of the present disclosure provide a metric for each object, the metric being usable to identify locality of column and non-column objects within in-memory databases. In some examples, the metric is determined based on executing a benchmark workload (e.g., TPC-H). In accordance with implementations of the present disclosure, a benchmark workload is executed on an instrumented in-memory database system to provide a metric for each object implicated by the benchmark workload. In some examples, the metric is used to identify a respective object as a hot object (e.g., relatively frequently accessed), or a cold object (e.g., relatively less frequently accessed), and to allocate the object accordingly (e.g., DRAM, NVM).

In some examples, access to an object can be classified as: access to same memory location; random access; sequential access; or access to same cache line. In some examples, access to same memory location means that an object has temporal locality. In some examples, random access means that there is no identified pattern in which the object is accessed. For example, if a hash lookup is being performed on some object, then access to the object can be a random access. In some examples, sequential lookup means that the memory locations objects are being accessed from are sequential in an order. In some examples, access to same cache line (e.g., typically 64 bytes) exhibits spatial locality, indicating that nearby memory locations are likely to be accessed. The above example access patterns can be described as generic.

As introduced above, implementations of the present disclosure provide a specialized metric to identify hot and cold objects. Through such metric, it is relatively quick and easy to identify which objects of an in-memory database are critical and suitable for storage in NVM.

In order to determine whether an object is a hot object or a cold object, it is first determined how much percentage of memory area within each object is critical. In some examples, critical indicates the memory location(s) that are actually accessed during execution of a query implicating the object. Further, the frequency of data accesses to all of the memory locations of the object are determined. In some examples, this can be determined by dividing each object into blocks of a fixed size (e.g., 64 bytes), and measuring data accesses to each of the blocks. Implementations of the present disclosure provide the following example metrics for identifying object locality.

In some examples, a first metric (Metric I ($M_I$)) provides a percentage of blocks (of a object) that were accessed in main memory at least once according to the following example relationship:

$$\frac{\sum_{i=0}^{n} B_i [\text{Blocks with Accesses to Main Memory} > 1]}{Block_{ALL}} \times 100$$

In some examples, a second metric (Metric II ($M_{II}$)) provides a percentage of blocks that were accessed in memory more than m times according to the following example relationship:

$$\frac{\sum_{i=0}^{n} B_i [\text{Blocks with Accesses to Main Memory} > m]}{Block_{ALL}} \times 100$$

Through experimentation of implementations of the present disclosure, it was determined that m=8 for in-memory database workloads is an optimized and representative value, which distinguishes frequently accessed objects from in-frequently accessed objects.

In some examples, a third metric (Metric III ($M_{III}$)) provides an average number of accesses per block within each object according to the following example relationship:

$$\frac{Total\_Accesses}{\sum_{i=0}^{n} B_i}$$

In some examples, a fourth metric (Metric IV ($M_{IV}$)) provides a percentage of total accesses to each object within each operator of a QEP according to the following example relationship:

$$\frac{\sum_{i=0}^{n} Accesses\_to\_Object_i [\text{Within Single } QEP \text{ Operator}]}{\sum_{i=0}^{n} Accesses\_to\_Object_i [\text{Total Accesses in All } QEP \text{ Operators}]} \times 100$$

In some examples, a fifth metric (Metric V ($M_V$)) provides a percentage of main memory accesses to each object within each operator of the QEP according to the following example relationship:

$$\frac{\sum_{i=0}^{n} MM\_Accesses\_Object_i [\text{Within Single } QEP \text{ Operator}]}{\sum_{i=0}^{n} MM\_Accesses\_Object_i} \times 100$$

[Total Accesses in All QEP Operators]

In some examples, in the above-example metrics, n=8 and $$Block_{ALL} = \frac{Object\_size}{Block\_size}.$$

In accordance with implementations of the present disclosure the metrics are used to determine which objects to put on DRAM and which objects to put on NVM. Algorithm 3, below, provides an example algorithm for using the metrics:

```
Algorithm 3: Object Placement

T_I, ..., T_V are respective thresholds for M_I, ..., M_V
Examples:
    T_I = 50
    T_II = 40
    T_III = 5
    T_IV = 50
    T_V = 30
If M_I < T_I
    Place object on NVM
else
    Place object on DRAM
or
If M_II ≤ T_II
    Place object on NVM
else
    Place object on DRAM
or
If M_III > T_III
    Place object on DRAM
else
    Place object on NVM
or
If M_IV > T_IV
    Place object on DRAM
else
    Place object on NVM
or
If M_V < T_V
    Place object on NVM
else
    Place object on DRAM
```

Figure 4:
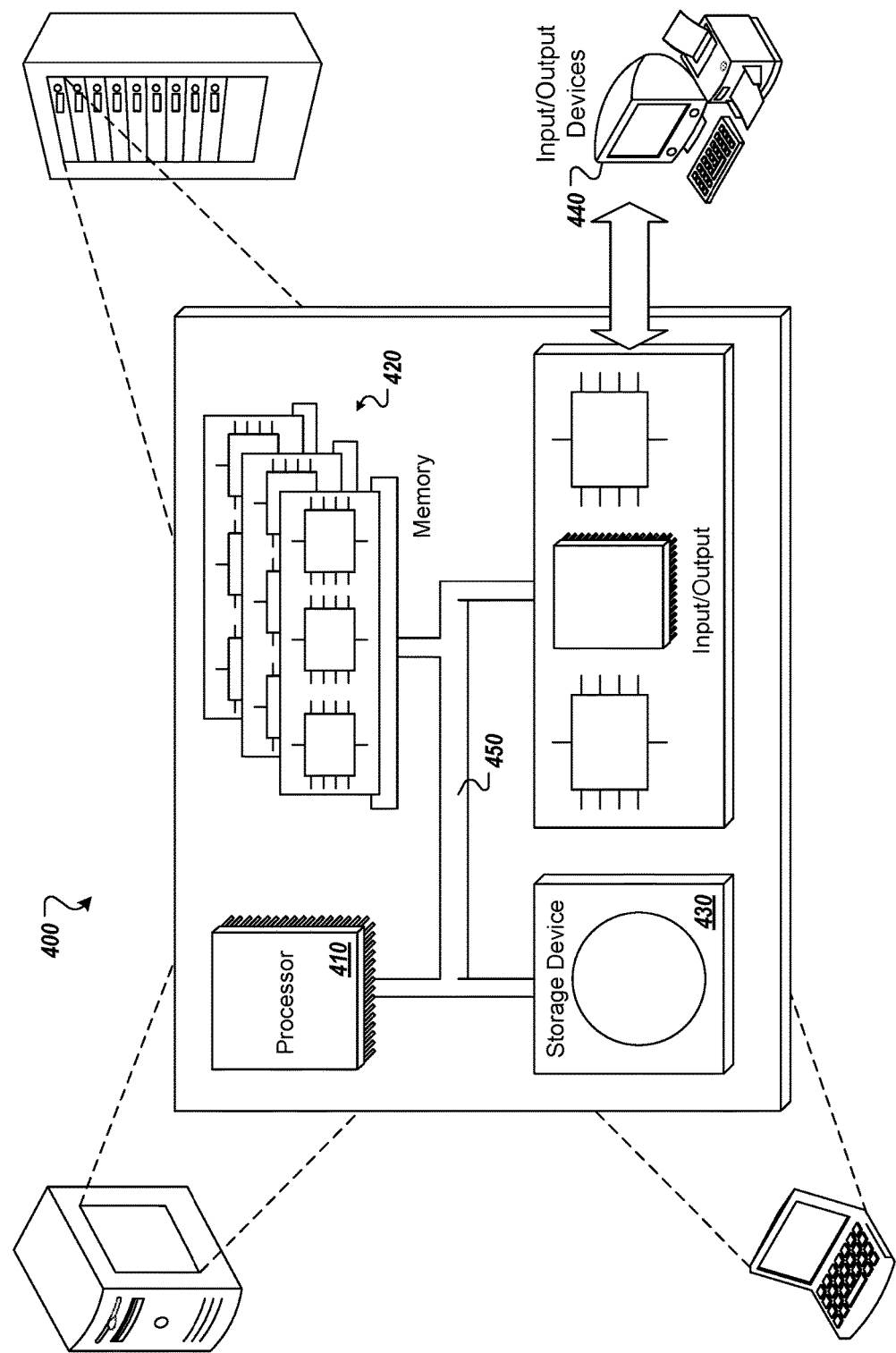
FIG. 4 is a schematic illustration of example computer systems that may be employed for implementations such as those of the present disclosure.

FIG. 4 depicts a schematic diagram of an example computing system 400. The system 400 may be used to perform the operations described with regard to one or more implementations of the present disclosure. For example, the system 400 may be included in any or all of the server components, or other computing device(s), discussed herein. The system 400 may include one or more processors 410, one or more memories 420, one or more storage devices 430, and one or more input/output (I/O) devices 440. The components 410, 420, 430, 440 may be interconnected using a system bus 450.

The processor 410 may be configured to execute instructions within the system 400. The processor 410 may include a single-threaded processor or a multi-threaded processor. The processor 410 may be configured to execute or otherwise process instructions stored in one or both of the memory 420 or the storage device 430. Execution of the instruction(s) may cause graphical information to be displayed or otherwise presented via a user interface on the I/O device 440. The processor(s) 410 may include the CPU 102.

The memory 420 may store information within the system 400. In some implementations, the memory 420 is a computer-readable medium. In some implementations, the memory 420 may include one or more volatile memory units. In some implementations, the memory 420 may include one or more non-volatile memory units. The memory 420 may include the hybrid main memory system 104.

The storage device 430 may be configured to provide mass storage for the system 400. In some implementations, the storage device 430 is a computer-readable medium. The storage device 430 may include a floppy disk device, a hard disk device, an optical disk device, a tape device, or other type of storage device. The I/O device 440 may provide I/O operations for the system 400. In some implementations, the I/O device 440 may include a keyboard, a pointing device, or other devices for data input. In some implementations, the I/O device 440 may include output devices such as a display unit for displaying graphical user interfaces or other types of user interfaces.

The features described may be implemented in digital electronic circuitry, or in computer hardware, firmware, software, or in combinations of them. The apparatus may be implemented in a computer program product tangibly embodied in an information carrier (e.g., in a machine-readable storage device) for execution by a programmable processor; and method steps may be performed by a programmable processor executing a program of instructions to perform functions of the described implementations by operating on input data and generating output. The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, application-specific integrated circuits (ASICs).

To provide for interaction with a user, the features may be implemented on a computer having a display device such as a cathode ray tube (CRT) or liquid crystal display (LCD) monitor for displaying information to the user and a keyboard and a pointing device such as a mouse or a trackball by which the user may provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include, e.g., a local area network (LAN), a wide area network (WAN), and the computers and networks forming the Internet.

The computer system may include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method executed by one or more processors, the method comprising:

receiving, by one or more processors, source code of an application;

providing, by the one or more processors, intermediate code based on the source code, the intermediate code comprising at least one instruction for profiling a plurality of objects accessed from computer-readable memory by the application;

providing, by the one or more processors, a statistics file by processing the intermediate code, the statistics file comprising data generated by a cache simulator, the data indicating, for each object of the plurality of objects, a sequential access count (SAC) and a random access count (RAC), the SAC indicating a first number of times a respective object was sequentially accessed by the application during execution of a workload, and the RAC indicating a second number of times the respective object was randomly accessed by the application during execution of the workload;

providing, by the one or more processors, a list of objects, the list of objects identifying, for each object, a memory type for placement of the respective object by the application in a hybrid memory system based on the RAC of the respective object relative to a total access count indicating a total number of times the respective object was both sequentially accessed and randomly accessed by the application during execution of the workload; and placing, by the one or more processors, the plurality of objects in the hybrid memory system during execution of the application based on the list of objects.

2. The method of claim 1, wherein, during processing of the intermediate code, the SAC is incremented for the respective object, if memory locations of consecutive accesses are identical.

3. The method of claim 1, wherein, during processing of the intermediate code, the SAC is incremented for the respective object, if memory locations of consecutive accesses are within a threshold distance of one another.

4. The method of claim 1, wherein, during processing of the intermediate code, the RAC is incremented for the respective object, if memory locations of consecutive accesses are not identical, and if memory locations of consecutive accesses are not within a threshold distance of one another.

5. The method of claim 1, wherein the list of objects comprises the plurality of objects, and, for each object, indicates whether the respective object is to be placed on one of a first memory type and a second memory type.

6. The method of claim 1, wherein the respective object is associated with a first memory type, if the RAC exceeds a threshold, and is associated with a second memory type if the RAC does not exceed the threshold.

7. The method of claim 1, wherein the hybrid memory system comprises at least dynamic random access memory (DRAM) and non-volatile memory (NVM).

8. A non-transitory computer-readable storage medium coupled to one or more processors and having instructions stored thereon which, when executed by the one or more processors, cause the one or more processors to perform operations comprising:
   receiving source code of an application;
   providing intermediate code based on the source code, the intermediate code comprising at least one instruction for profiling a plurality of objects accessed from computer-readable memory by the application;
   providing a statistics file by processing the intermediate code, the statistics file comprising data generated by a cache simulator, the data indicating, for each object of the plurality of objects, a sequential access count (SAC) and a random access count (RAC), the SAC indicating a first number of times a respective object was sequentially accessed by the application during execution of a workload, and the RAC indicating a second number of times the respective object was randomly accessed by the application during execution of the workload;
   providing a list of objects, the list of objects identifying, for each object, a memory type for placement of the respective object by the application in a hybrid memory system based on the RAC of the respective object relative to a total access count indicating a total number of times the respective object was both sequentially accessed and randomly accessed by the application during execution of the workload; and
   placing the plurality of objects in the hybrid memory system during execution of the application based on the list of objects.

9. The non-transitory computer-readable storage medium of claim 8, wherein, during processing of the intermediate code, the SAC is incremented for the respective object, if memory locations of consecutive accesses are identical.

10. The non-transitory computer-readable storage medium of claim 8, wherein, during processing of the intermediate code, the SAC is incremented for the respective object, if memory locations of consecutive accesses are within a threshold distance of one another.

11. The non-transitory computer-readable storage medium of claim 8, wherein, during processing of the intermediate code, the RAC is incremented for the respective object, if memory locations of consecutive accesses are not identical, and if memory locations of consecutive accesses are not within a threshold distance of one another.

12. The non-transitory computer-readable storage medium of claim 8, wherein the list of objects comprises the plurality of objects, and, for each object, indicates whether the respective object is to be placed on one of a first memory type and a second memory type.

13. The non-transitory computer-readable storage medium of claim 8, wherein the respective object is associated with a first memory type, if the RAC exceeds a threshold, and is associated with a second memory type if the RAC does not exceed the threshold.

14. The non-transitory computer-readable storage medium of claim 8, wherein the hybrid memory system comprises at least dynamic random access memory (DRAM) and non-volatile memory (NVM).

15. A system, comprising:
   a computing device; and
   a computer-readable storage device coupled to the computing device and having instructions stored thereon which, when executed by the computing device, cause the computing device to perform operations comprising:
      receiving source code of an application;
      providing intermediate code based on the source code, the intermediate code comprising at least one instruction for profiling a plurality of objects accessed from computer-readable memory by the application;
      providing a statistics file by processing the intermediate code, the statistics file comprising data generated by a cache simulator, the data indicating, for each object of the plurality of objects, a sequential access count (SAC) and a random access count (RAC), the SAC indicating a first number of times a respective object was sequentially accessed by the application during execution of a workload, and the RAC indicating a second number of times the respective object was randomly accessed by the application during execution of the workload;
      providing a list of objects, the list of objects identifying, for each object, a memory type for placement of the respective object by the application in a hybrid memory system based on the RAC of the respective object relative to a total access count indicating a total number of times the respective object was both sequentially accessed and randomly accessed by the application during execution of the workload; and
      placing the plurality of objects in the hybrid memory system during execution of the application based on the list of objects.

16. The system of claim 15, wherein, during processing of the intermediate code, the SAC is incremented for the respective object, if memory locations of consecutive accesses are identical.

17. The system of claim 15, wherein, during processing of the intermediate code, the SAC is incremented for the respective object, if memory locations of consecutive accesses are within a threshold distance of one another.

18. The system of claim 15, wherein, during processing of the intermediate code, the RAC is incremented for the respective object, if memory locations of consecutive accesses are not identical, and if memory locations of consecutive accesses are not within a threshold distance of one another.

19. The system of claim 15, wherein the list of objects comprises the plurality of objects, and, for each object, indicates whether the respective object is to be placed on one of a first memory type and a second memory type.

20. The system of claim 15, wherein the respective object is associated with a first memory type, if the RAC exceeds a threshold, and is associated with a second memory type if the RAC does not exceed the threshold.

* * * * *